Figure 1:
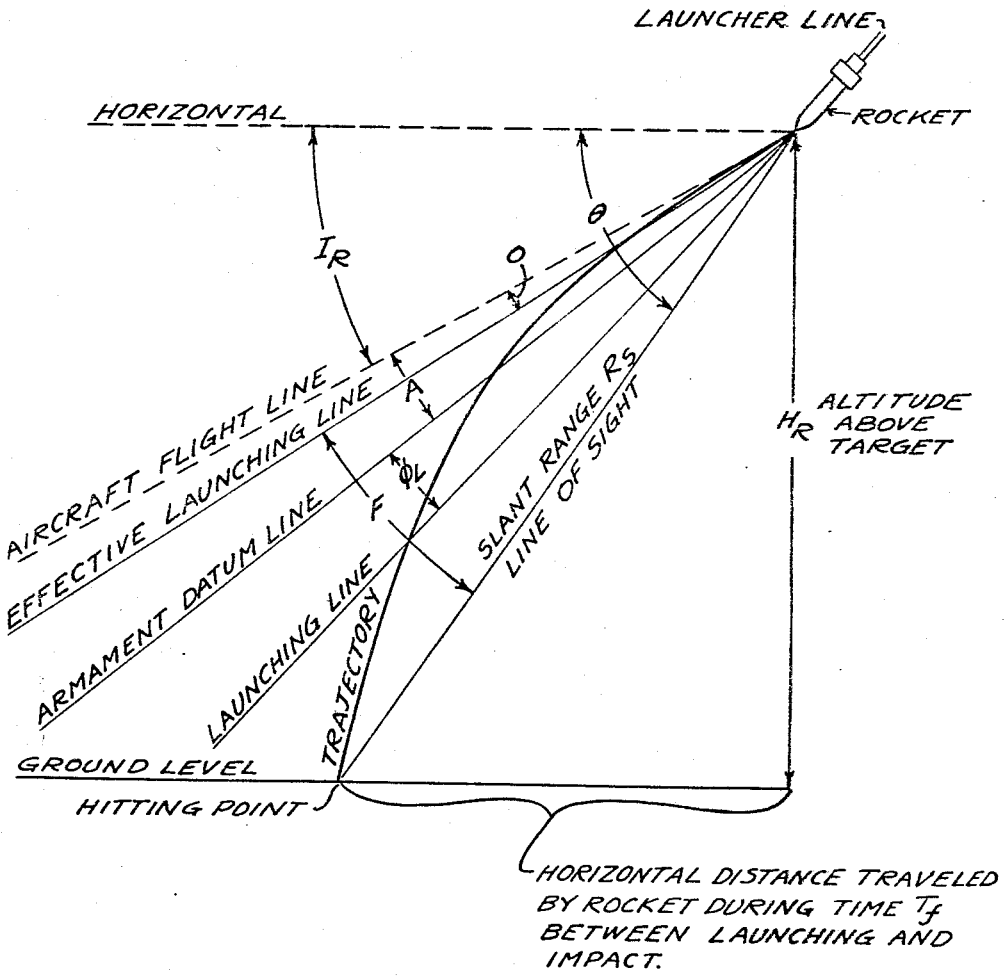

Aug. 15, 1961  H. E. LUSTIG  2,996,243
ROCKET BALLISTICS COMPUTER
Filed April 17, 1956  2 Sheets-Sheet 1

INVENTOR
HOWARD E. LUSTIG.
BY
ATTORNEY

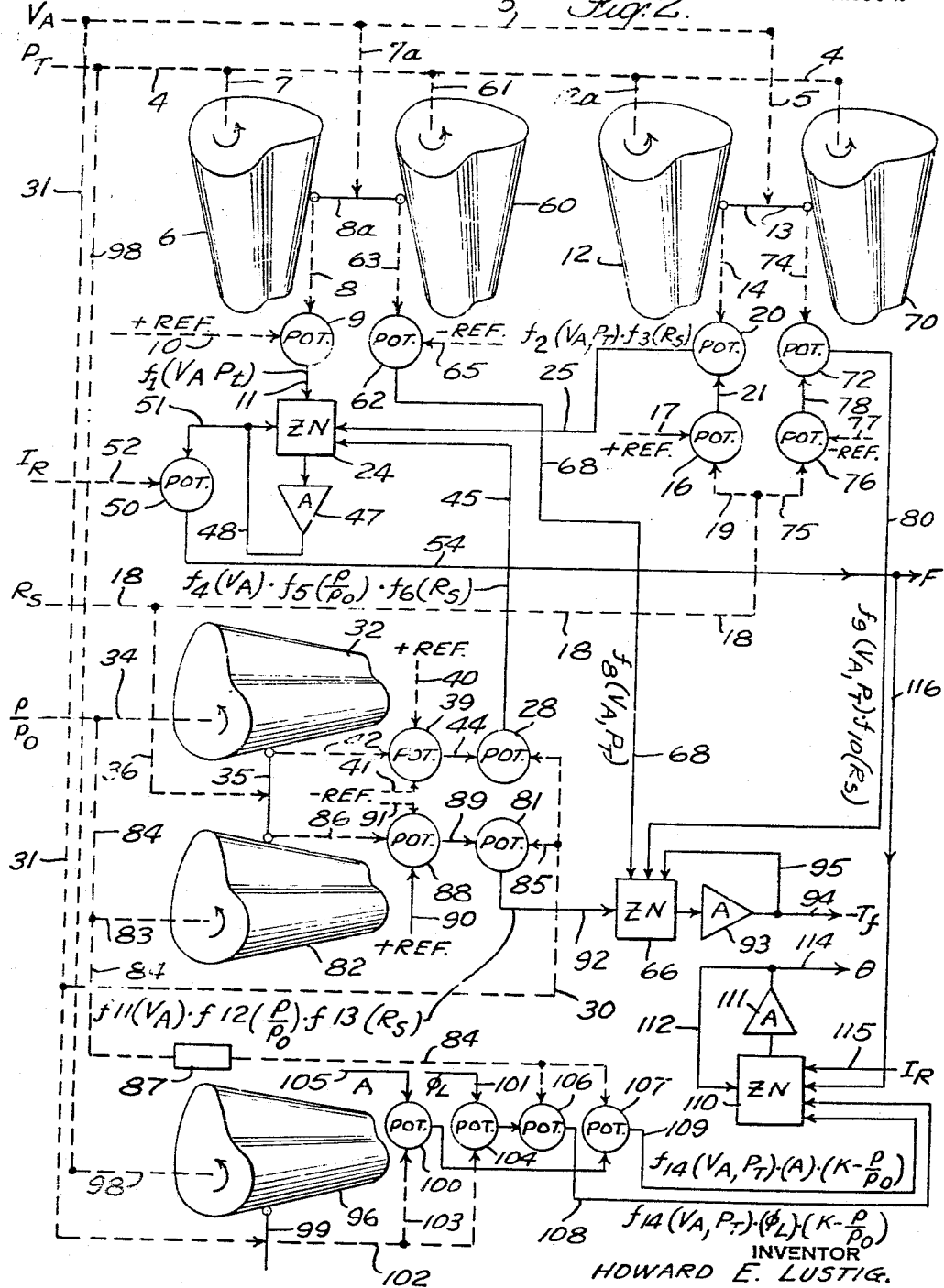

United States Patent Office 2,996,243
Patented Aug. 15, 1961

2,996,243
ROCKET BALLISTICS COMPUTER
Howard E. Lustig, Flushing, N.Y., assignor to Sperry Rand Corporation, Ford Instrument Company Division, Long Island City, N.Y., a corporation of Delaware
Filed Apr. 17, 1956, Ser. No. 578,711
1 Claim. (Cl. 235—61.5)

This invention relates to a ballistics device for computing time of fall, trajectory drop and a deviation angle and deriving angle of sight $\theta$ which are values required for accurate fire control of rockets and particularly to a ballistics computer which is capable of generating these quantities on the basis of all the rocket parameters which are known to affect the desired output.

It has been found that trajectory drop, dive angle and deviation angle can be employed to generate values of angle of sight. Rocket ballistics computers have been hitherto employed to compute trajectory drop and time of fall for a limited number and range of variables so that a reasonably close fit was obtained between their output and the trajectory data supplied by ballistics tables for a particular rocket. The accuracy of these computers is limited by the fact that fewer variables are employed by them than the number of rocket parameters that actually determine the solutions. According to this invention all the relevant variables are employed by the mechanism which is arranged in accordance with assumed formulae to produce trajectory information which is closer to empirically determined tabulated data than has been formerly produced by mechanical devices. The mechanism which embodies a preferred form of the invention has been reduced to a simple and efficient form to the end that the individual units are arranged to combine functions involving no more than two parameters at a time. The particular units are so chosen that a relatively large range of inputs for each of the required variables may be employed by the computer in determining a correspondingly large amount of ballistics data.

An object of the invention is to provide means for computing trajectory drop and deviation angle and for the purpose of deriving angle of sight for a particular rocket for which ballistics table data is available, when the following input quantities are available: airspeed, propellant temperature, slant range to target, dive angle and relative air density.

Other objects and advantages will be apparent on reading the following description of the ballistics computer which is illustrated by drawings, in which FIG. 1 shows graphically the flight and trajectory quantities employed by the computer; and FIG. 2 is a schematic arrangement of the ballistics computer according to the invention in which solid lines represent electrical connections and dash lines represent mechanical connections.

The computer is mechanized to compute trajectory drop, F, and time of fall, $T_f$, and deviation angle D and angle of sight $\theta$ in terms of airspeed ($V_A$), propellant temperatures ($P_T$), slant range to target ($R_S$), dive angle ($I_R$) and relative air density $$\frac{P}{P_0}$$

As may be seen in FIG. 1 the trajectory drop of a rocket may be defined for forward firing from an airplane as the vertical angular drop from the effective launching line to the line of sight. Time of fall may be defined as the elapsed time from the rocket release time to the rocket impact time. The angle D is the deviation of the effective launching line from the flight line.

The mechanization is governed by the following assumed equations for a 2.75 inch FFAR rocket.

(1)
$$F = \left[ f_1(V_A, P_T) + f_2(V_A, P_T) \times f_3(R_S) - f_4(V_A) \right.$$
$$\left. \times f_5\left(\frac{P}{P_0}\right) \times f_6(R_S) \right] \times f_7(I_R)$$

(2)
$$T_f = f_8(V_A, P_T) + f_9(V_A, P_T) \times f_{10}(R_S) - f_{11}(V_A)$$
$$\times f_{12}\left(\frac{P}{P_0}\right) \times f_{13}(R_S)$$

(3)
$$D = f_{14}(V_A, P_T)\left[(A)\left(K - \frac{P}{P_0}\right)\right]$$
$$+ f_{14}(V_A, P_T)\left[(\phi_L)\left(K - \frac{P}{P_0}\right)\right]$$

(4)
$$\theta = I_R + D + F$$

In the mechanization of Equations 1 and 2 for trajectory drop F and time of fall $T_f$, three dimensional cams and potentiometers are employed to yield outputs which are functions of one or two variable inputs. The functions represented on each cam and potentiometer are empirically derived to give trajectory values in the output of the system which are in close agreement with tabulated values for the same inputs. For example it has been found that the mechanization yields average values of the absolute value of error of 0.79 mil for trajectory drop and .047 second for time of fall $T_f$.

Accordingly, shafts 4 and 5 are settable in accordance with values for propellant temperature $P_T$ and speed of the airplane $V_A$. The velocity $V_A$ is an instantaneous value and should the actual speed at the release significantly differ, a straight line approach to the vicinity of the release point would not be possible. A three dimensional cam 6 is rotatably driven on shaft 7 which is connected to shaft 4. A shaft 7a is connected to shaft 5 and positions cam follower 8a of the cam 6 axially by conventional means (not shown), and the output of the cam representing the dependent value of the function for the two input values is placed on output shaft 8 which is operatively connected to potentiometer 9 to orient the same proportionately to the value of the function. The potentiometer 9 serves to convert the mechanical cam output to an analogue voltage. An input voltage lead 10 positively references the potentiometer being connected to a voltage supply (not shown). A lead 11 connects the output of the potentiometer 9 to an adding network 24 to place the function, $f_1(V_A, P_T)$, therein.

A three dimensional cam 12 is similarly positioned by means of the shaft 4 which rotatively drives shaft 12a and cam 12 which is rotatably mounted thereon. Shaft 5 axially positions a cam follower 13 for the cam 12 the surface of which is profiled according to a second function for velocity and propellant temperature, namely, $f_2(V_A, P_T)$. The cam output is placed in potentiometer 20 by means of shaft 14. The empirically derived function for slant range $f_3(R_S)$, is built into the windings of potentiometer 16 which is positively referenced by lead 17. A value for the input, $R_S$, which is placed in the potentiometer 16 by connected shafts 18 and 19, is introduced to potentiometer 20 by means of lead 21 connecting the two potentiometers. The output of the potentiometer 20 is placed in the network 24 by means of lead 25 connecting the two units and represents a value for the product of the functions $f_2(V_A, P_T)$ and $f_3(R_S)$.

A potentiometer 28 is wound to yield a fourth function for the single variable $V_A$, namely, $f_4(V_A)$. Values for $V_A$ are placed in the potentiometer 28 by means of connected shafts 30 and 31 which is operatively connected to shaft 5. A three dimensional cam 32 is adapted to generate the product of the functions $$f_5\left(\frac{P}{P_0}\right) \text{ and } f_6(R_S)$$

and is driven in rotation by shaft 34 which is settable in accordance with values for relative air density $$\frac{P}{P_0}$$

A cam follower 35 is positioned by shaft 36 which is connected to shaft 18 to introduce values for slant range $R_S$ into the cam 32. Potentiometer 39 is positively referenced by lead 40 and negatively referenced by lead 41, and is driven by cam output shaft 42, the output of potentiometer 39 being fed to the potentiometer 28 by lead 44. The output of potentiometer 28 is placed in network 24 by lead 45 and represents the value of the product of the functions.

$$f_4(V_A), f_5\left(\frac{P}{P_0}\right) \text{ and } f_6(R_S)$$

The output of network 24 is amplified by amplifier 47 the output of which is connected to the network 24 by feedback line 48 and to potentiometer 50 by feed-back line 48 and lead 51. The potentiometer 50 is arranged to represent an empirical function of dive angle, $f_7(I_R)$. A shaft 52 settable in accordance with a range of values for $I_R$ is provided to drive the potentiometer 50 which is employed to multiply values for the function $f_7(I_R)$ and the output of the network 24. Accordingly potentiometer 50 output connection 54 has placed thereon values which satisfy Equation 1.

Equation 2 is mechanized as follows: Three dimensional cam 60 has a predetermined function of the variables $V_A$ and $P_T$ profiled on its surface and is rotatively positioned by shaft 61 which is connected to the shaft 4. Cam follower 8a bears against the surface of cam 60 to pick off values for the function $f_8(V_A,P_T)$ therefrom and place the cam output into potentiometer 62 by means of output shaft 63. The potentiometer 62 is negatively referenced by lead 65 and introduces an electrical equivalent of the value for this function into adding network 66 by means of lead 68 which connects the two units.

Cam 70 is rotatively positioned by shaft 4 and the cam follower 13 is adapted to bear on its surface to pick off values for the function $f_9(V_A,P_T)$ which are employed to drive potentiometer 72 through output shaft 74. A potentiometer 76 is arranged to yield a function of the single variable $R_S$, namely, $f_{10}(R_S)$ being driven by shaft 75 which is connected to the shaft 18. The potentiometer 76 is negatively referenced by lead 77 and values for the $R_S$ function are fed to the potentiometer 72 on lead 78 which is powered by voltages representing their electrical equivalent. Output lead 80 connecting the potentiometer 72 and the network 66 is thereby enabled to furnish values for the product of the functions $f_9(V_A,P_T)$ and $f_{10}(R_S)$. A potentiometer 81 is wound to represent a velocity function $f_{11}(V_A)$ and values for velocity $V_A$ are placed therein by shaft 30 and shaft 85 which is driven thereby.

A cam 82 which is profiled according to the product of the functions $$f_{12}\left(\frac{P}{P_0}\right) \text{ and } f_{13}(R_S)$$

is rotatively positioned by shaft 83 and shaft 84, which is connected to shaft 34, to introduce values for relative air density $$\frac{P}{P_0}$$

therein. Cam follower 35 bearing on the surface on the cam 82 is employed to introduce values for slant range $R_S$. Quantities representing the generated output of the cam 82 are represented on output shaft 86 being introduced to the potentiometer 88 which is employed to drive the potentiometer 81 through lead 89. The potentiometer 88 is positively referenced by lead 90 and negatively referenced by lead 91. The output of potentiometer 81 on output connection 92 is fed to the network 66 and represents the electrical equivalent of values for the functions $$f_{11}(V_A) \cdot f_{12}\left(\frac{P}{P_0}\right) \cdot f_{13}(R_S)$$

The output of network 66 should satisfy Equation 2 being amplified by amplifier 93 before its introduction to the output lead 94. A feed-back lead 95 connects the output of the amplifier 93 and network 66 to assure that the entire value for time of fall $T_f$ is placed in the output lead.

As shown in FIG. 1 the angle $\theta$, which is the sum of $I_R$, D and F, is required in order to plot the locus of release points along the line of sight, the most propitious point being governed by the corresponding slant range, $R_S$, for the particular values of dive attack and trajectory drop. Mechanism is therefore provided for computing the angle D. Accordingly, three dimensioned cam 96 is rotatably mounted on shaft 98. Shaft 98 is in driven connection with shaft 4 which is settable in accordance with the values for propellant temperature, $P_T$. Cam follower 99 is positioned axially of cam 96 by means of shaft 31. The functional output $f_{14}(V_A,P_T)$ of cam 96 is fed to potentiometer 100 by output shaft 102 and driven shaft 103 and to potentiometer 104 by the shaft 102. The function is multiplied by the predetermined value for angle-of-attack, A, in the potentiometer 100 in which electrical quantities for A are introduced by lead 105. The function is similarly multiplied by fixed values of launcher angle, $\phi_L$, in the potentiometer 104 in which an electrical quantity for $\phi_L$ is introduced by lead 101.

Potentiometers 106 and 107 are connected to receive the output of potentiometers 104 and 100, respectively, and being connected to shaft 84, which is settable in accordance with values of relative density, serve to combine the factor $$\left(K - \frac{P}{P_0}\right)$$

in their output in accordance with Equation 3. The density factor is produced in differential gear box 87 which introduces the empirical constant K. Leads 108 and 109, which are connected to the output side of the potentiometers 106 and 107, respectively, introduce to adding network 110 values which are combined to yield the angle D as required by Equation 3.

In accordance with Equation 4, the computed values of dive angle $I_R$ and trajectory drop F are introduced by leads 115 and leads 54 and 116, respectively, to the adding network 110. The output of network 110 is amplified in amplifier 111 to give values for D which are fed back to the adding network 110 by lead 114 and placed in output lead 112.

In accordance with Equation 4 there is provided an adder 118 which serves to sum the quantities representing dive angle $I_R$, deviation angle D and trajectory drop F. To this end the adder 118 is connected to receive the output of lines 54 and 112 and in addition is connected by line 119 to $I_R$ potentiometer 120 which is driven by an $I_R$ shaft 52 and connected shaft 52a. The adder 118 is thus adapted to yield the angle of sight $\theta$ to the output of the computer.

It will be understood that it is the general arrangement of the computer units and their relation to each other as determined by the assumed formulae rather than the character of the individual components that constitute the invention which should be construed solely in accordance with the following claims.

What is claimed is:

A ballistics computer comprising a function generator, a summing network connected to receive the output of said function generator, a second function generator, a pair of input shafts in driving connection with each of said function generators, a third input connection, a multiplier connected to said second function generator and said third input connection, said summing network being connected also to receive the output of said multiplier, a third function generator, a second pair of input shafts in driving connection with said third function generator, a function generator and multiplier connected to said third function generator and to one of the first mentioned pair of input shafts, said summing network being connected also to receive the output of said function generator and multiplier.

References Cited in the file of this patent
UNITED STATES PATENTS

| | | |
|---|---|---|
| 1,576,367 | Schneider | Mar. 9, 1926 |
| 2,511,197 | Darlington et al. | June 13, 1950 |
| 2,595,185 | Zauderer et al. | Apr. 29, 1952 |
| 2,638,269 | Holschuh et al. | May 12, 1953 |
| 2,671,613 | Hansen | Mar. 9, 1954 |
| 2,784,501 | Stern et al. | Mar. 12, 1957 |

OTHER REFERENCES

Mynall: Electric Analogue Amputing (part 2), Electronic Engineering (July 1947), pp. 214–217.